(12) United States Patent
Kim

(10) Patent No.: US 11,850,991 B1
(45) Date of Patent: Dec. 26, 2023

(54) CAR LAMP CAPABLE OF SOUND OUTPUT AND COMMUNICATION SYSTEM USING THE SAME

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/146,211

(22) Filed: Dec. 23, 2022

(30) Foreign Application Priority Data

Jun. 7, 2022 (KR) .......... 10-2022-0068846

(51) Int. Cl.
| | | |
|---|---|---|
| *B60Q 1/00* | (2006.01) | |
| *B60Q 5/00* | (2006.01) | |
| *B60Q 1/04* | (2006.01) | |
| *H04R 1/02* | (2006.01) | |
| *F21S 43/20* | (2018.01) | |

(52) U.S. Cl.
CPC ............ *B60Q 1/0017* (2013.01); *B60Q 1/04* (2013.01); *B60Q 5/00* (2013.01); *F21S 43/26* (2018.01); *H04R 1/028* (2013.01)

(58) Field of Classification Search
CPC ........ B60Q 1/0017; B60Q 1/26; B60Q 1/143; B60Q 5/006; B60Q 1/04
See application file for complete search history.

(56) References Cited

U.S. PATENT DOCUMENTS

2013/0058121 A1* 3/2013 Tatara .................. G10K 9/22
362/546

FOREIGN PATENT DOCUMENTS

KR      2018-0074978         7/2018

OTHER PUBLICATIONS

English Language Abstract of KR 2018-0074978 published Jul. 4, 2018.

* cited by examiner

*Primary Examiner* — William J Carter
(74) *Attorney, Agent, or Firm* — DLA PIPER LLP (US)

(57) ABSTRACT

A car lamp capable of sound output and a communication system using the same, and in particular, a car lamp capable of sound output by installing a piezo speaker-type actuator on an inner surface of an outer lens of the car lamp and a communication system that may synchronize and output a video signal and an audio signal using the same.

10 Claims, 6 Drawing Sheets

CAR LAMP CAPABLE OF SOUND OUTPUT AND COMMUNICATION SYSTEM USING THE SAME

CROSS-REFERENCE TO RELATED APPLICATIONS

This application claims priority under 35 U.S.C. § 119 to Korean Patent Application No. 10-2022-0068846, filed on Jun. 7, 2022, in the Korean Intellectual Property Office, the disclosure of which is incorporated herein by reference in its entirety.

TECHNICAL FIELD

The following disclosure relates to a car lamp capable of sound output and a communication system using the same, and in particular, to a car lamp capable of sound output by installing a piezo speaker-type actuator on an inner surface of an outer lens of the car lamp and a communication system that may synchronize and output a video signal and an audio signal using the same.

BACKGROUND

Headlamps in automobiles play an important role in both function and design of automobiles. Headlamps provide the driver's visibility at night and provide a function to alert other cars or pedestrians to the presence of cars. Headlamps are crucial as a design element to the extent that they are considered to be the eyes of automobiles. Headlamps are important components that are changed even in facelift models, etc.

Before the 1970s, incandescent light bulbs called filaments were used in headlamps, but these incandescent light bulbs had limitations as headlamps due to their short lifespan and low luminance. Halogen lamps developed thereafter had the advantages of a wide diffusion angle, easy viewing, and miniaturization. Afterwards, by way of high intensity discharge (HID) lamps, LED lamps have recently been widely used rapidly.

Recently, headlamps for automobiles have been provided to perform entertainment or communication functions through output of various image signals, rather than simply irradiating light to secure a front view.

However, current car lamps including headlamps output video signals, but not audio signals.

Of course, it may be possible to perform audio output through an audio output device at a location other than the car lamp, but in order to output audio to the head lamp, a hole for mounting a separate audio output device may need to be formed in an external housing (e.g., an outer lens) of a car lamp and the audio output device may be installed therein, which, however, may increase man-hours and cause various problems in that foreign substances such as rainwater are introduced into the lamp.

Therefore, improvement of a car lamp capable of performing various functions including entertainment functions and communication functions as an audio synchronized with an image output from the car lamp is output is required.

RELATED ART DOCUMENT

[Patent Document]
Korean Patent Laid-Open Publication No. 10-2018-0074978 (published on Jul. 4, 2018)

SUMMARY

An exemplary embodiment is directed to providing a car lamp capable of sound output, in which a piezo speaker-type actuator is installed on an inner surface of an outer lens of the car lamp and a controller synchronizes and outputs a video signal and an audio signal through the car lamp, thereby performing a high level of communication function, as well as sound output, and a communication system using the same.

The present invention has the following features in order to solve the above problems.

In one general aspect, a car lamp capable of sound output includes a light source; an outer lens disposed on a front side of the light source; at least one actuator provided on one side of the outer lens to contact the outer lens based on a received audio signal to vibrate the outer lens; and an audio amplifier amplifying the received audio signal and outputting the amplified audio signal to the actuator.

A contact region of the outer lens with which the actuator is in contact may be formed of a material so that a difference between a natural frequency of the actuator and a natural frequency of the contact region of the outer lens is within a predetermined range.

One side of the actuator may be in close contact with an inner surface of the outer lens facing the light source, wherein the car lamp may further include a vibration space portion as a space having a width of 2 mm or greater on the other side of the actuator so that the actuator vibrates.

The outer lens may include a light projection region and a non-projection region, and the actuator is installed in the non-projection region.

When at least one of a plurality of actuators is a first actuator and at least another one outputting a high-pitched sound band compared to the first actuator is a second actuator, a first region, which is a contact region of the outer lens with which the first actuator is in contact, may have lower rigidity than that of the second region, which is a contact region of the outer lens with which the second actuator is in contact. The outer lens may further include a fixing portion fixing at least a portion of the actuator.

In another general aspect, a communication system includes: a car lamp; and a controller transmitting a video signal and an audio signal generated based on received video data and audio data to the light source and the audio amplifier of the car lamp, respectively, wherein the controller transmits the video signal and the audio signal in synchronization.

The controller may detect a video delay time which is a time taken for the light source to output corresponding light after the video signal is transmitted to the light source and an audio delay time which is a time taken for the actuator to output corresponding vibration after the audio signal is transmitted to the actuator, and transmit the video signal and the audio signal so that the output light and the output vibration are synchronized with each other based on the video delay time and the audio delay time.

The communication system further includes a virtual engine sound generating unit generating a virtual engine sound of a car, wherein the virtual engine sound generating unit transmits the generated virtual engine sound to the actuator to output the virtual engine sound.

Other features and aspects will be apparent from the following detailed description, the drawings, and the claims.

DETAILED DESCRIPTION OF EXEMPLARY EMBODIMENTS

In order to explain the operational advantages of the present invention and the objects achieved by the practice of the present invention, exemplary embodiments of the present invention will be exemplified below and will be described with reference thereto.

Figure 1:
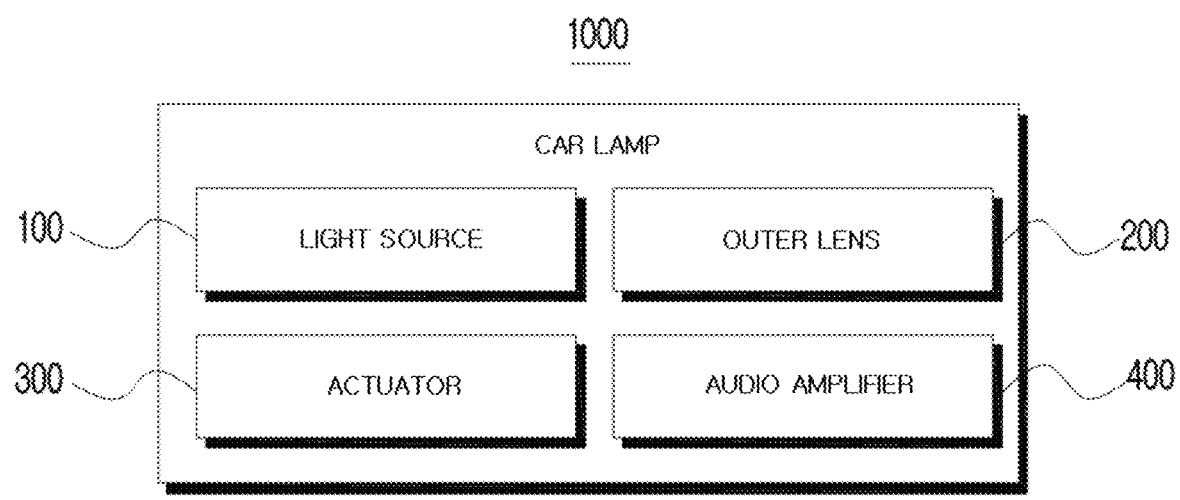
FIG. 1 is a block diagram illustrating an internal configuration of a car lamp according to an exemplary embodiment.
Figure 2:
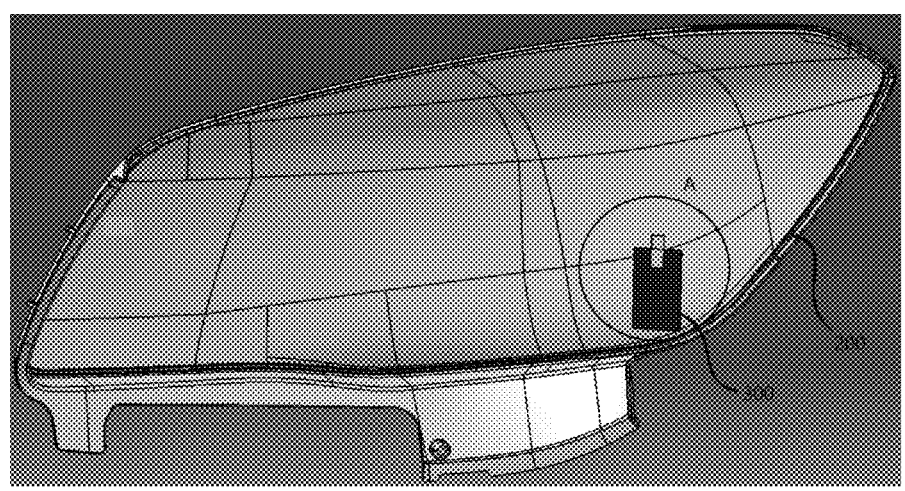
FIG. 2 is a view illustrating a state in which an actuator is provided in an outer lens according to an exemplary embodiment.
Figure 3:
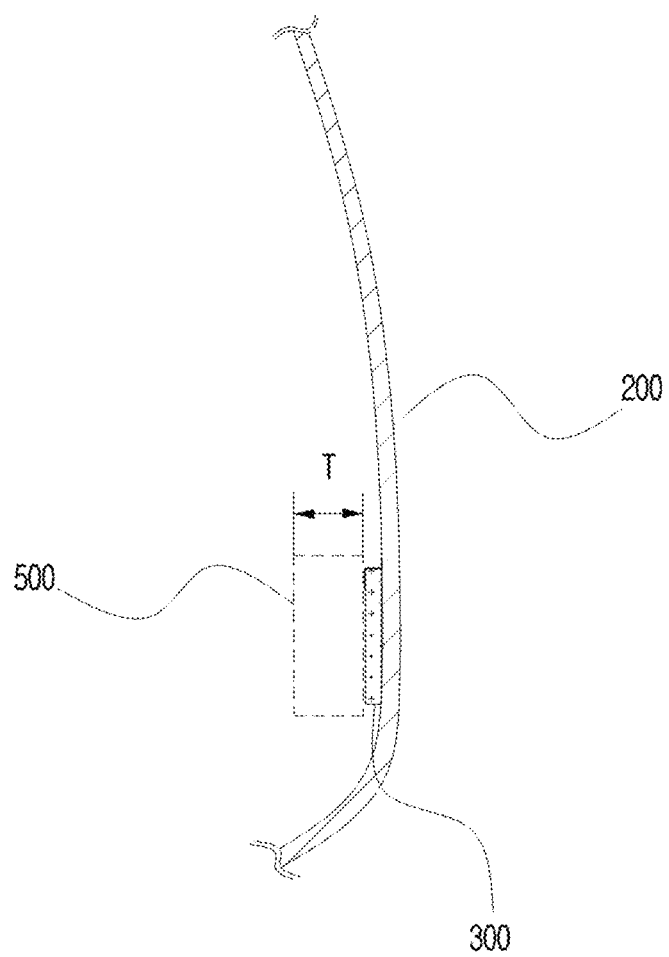
FIG. 3 is an enlarged cross-sectional view of portion A of FIG. 2.

FIG. 1 is a block diagram illustrating an internal configuration of a car lamp according to an exemplary embodiment, FIG. 2 is a view illustrating a state in which an actuator is provided on an outer lens according to an exemplary embodiment, and FIG. 3 is an enlarged cross-sectional view of portion A of FIG. 2.

Referring to FIGS. 1 and 2, a car lamp 1000 according to an exemplary embodiment includes a light source 100, an outer lens 200 disposed on a front side of the light source 100, at least one actuator 300 provided on one side of the outer lens 200 to contact the outer lens 200 based on a received audio signal to vibrate the outer lens 200, and an audio amplifier 400 amplifying the received audio signal to convert it into a pulse width modulation (PWM) signal, and outputting the PWM signal to the actuator 300.

Here, the light source 100 may be mainly applied to a daytime running light (DRL), which is commonly referred to as a general car headlamp, but may also be applied to various other car lamps, such as turn signals, fog lamps, side markers, rear lamps, and brake lamps.

In addition, the type of the light source 100 has also been developed variously, such as LED, OLED, or laser, in a bulb type light source, and the present invention is not limited to the type of the light source 100.

Meanwhile, the outer lens 200 may be located in the front in a light irradiation direction of the light source 100 to serve as a housing of the car lamp that protects the light source 100 not to be exposed to the outside and allow light irradiated from the light source 100 to be smoothly distributed.

As an example of a material of the outer lens 200, polycarbonate (PC) may be applied, and the PC has excellent impact resistance, dimensional stability, weather resistance, and electrical properties in a wide temperature range.

In addition to general PC, polycarbonate copolymer, heat resistant polycarbonate (PC-HT) having a high glass transition temperature may also be applied.

The actuator 300, which is the biggest feature of the present invention, is in close contact with one side of the outer lens 200 in the car lamp 1000 including the light source 100 and the outer lens 200, and such an actuator 300 may be a piezo speaker that vibrates according to the received audio signal.

A piezo speaker is a device that reversely uses a piezoelectric effect that generates electricity when pressure is applied, which is based on a principle that a sound is output according to vibration when contraction and expansion are repeatedly performed by applying an electrical signal.

The actuator 300 is in close contact with an inner surface of the outer lens 200, that is, a surface opposite to the light source 100, and provides vibration to the outer lens 200 according to the received audio signal.

Accordingly, the outer lens 200 vibrates, and this vibration outputs a sound in a forward direction of the car lamp 1000.

Here, in order to bring the actuator 300 into close contact with the outer lens 200, a separate adhesive may be applied to the actuator 300 to attach the actuator 300 to the outer lens 200, or the actuator 300 and the outer lens 200 may be attached through an adhesive unit such as a release tape, or a fixing portion in the form of a separate frame case may be formed on the outer lens 200 and the actuator 300 may be fixed to the fixing portion, and in addition, a coupling method of the actuator 300 and the outer lens 200 may vary.

Meanwhile, when one side of the actuator 300 is in close contact with the inner surface of the outer lens 200, a contact surface of the outer lens 200 may correspond to one side contact surface of the actuator 300 in shape to facilitate vibration transmission.

That is, the contact surface of the actuator 300 and the contact surface of the outer lens 200 may be formed to correspond in shape to each other, and as an adhesion rate increases, the vibration of the actuator 300 may be smoothly transmitted to the outer lens 200.

For example, when the contact surface of the actuator 300 is planarized, the contact surface of the outer lens 200 is also planarized.

In addition, on the other side of the actuator 300, that is, on the other side of the contact surface thereof in close contact with the outer lens 200, a vibration space portion 500 having a width of 2 mm or more so that the actuator 300 may vibrate is formed.

The car lamp 1000 may include various other components in addition to the light source 100 and the outer lens 200, and the vibration space portion 500 may be formed to have a width of 2 mm or greater to enable the actuator 300 to smoothly vibrate even though other components are located on the other side of the actuator 300 in close contact with the outer lens 200.

Of course, the vibration space portion 500 may have a width of 2 mm or greater with respect to the entire other side surface of the actuator 300.

Meanwhile, the audio amplifier 400 receives the audio signal from the controller provided in the car, converts the received audio signal into a pulse width modulation (PWM) signal and amplifies the PWM signal, and as the audio amplifier 400, a class D amplifier having characteristics of high performance, high efficiency, and ultra-light weight according to an exemplary embodiment may be applied.

This class D amplifier amplifies an audio signal in a digital state, and the digital amplifier converts the audio signal into a PWM signal and then amplifies the PWM signal.

Specifically, the class D amplifier may include a PWM modulator and a class D switching output stage that amplifies the PWM signal.

This class D amplifier receives an analog input, generates a PWM signal in an analog state, and switches and amplifies the PWM signal, and thus, since the class D amplifier is always in a digital state, the class D amplifier may be included in a digital amplifier.

Accordingly, in the audio amplifier 400 according to the present invention, since signal amplification is performed in a digital state, distortion of the signal may be fundamentally prevented when compared to an analog amplification circuit, and since the only the switching FET at the edge is involved in amplification, the audio amplifier 400 is free from thermal noise, so that a high S/N ratio may be secured in proportion to the number of quantization bits.

In addition, the existing analog class A and class AB amplifiers have energy efficiency of about 20 to 50% and loss thereof is generated as heat at the output stage of the amplifier. A heat dissipation plate is required to cool the heat generation, and as a result, power amplifiers may lose much power, may be heavy, bulky, and may have low mobility.

Meanwhile, the audio amplifier 400 according to the present invention may have an energy efficiency of 90% or more by switching amplification, so that a separate heat dissipation plate may be eliminated and the audio amplifier 400 may be manufactured as a compact, lightweight, and high-efficiency amplifier.

In addition, the PWM signal output from the audio amplifier 400 may be filtered through a low-pass filter (LPF) and then transmitted to the actuator 300 to generate audio output through vibration.

Figure 4:
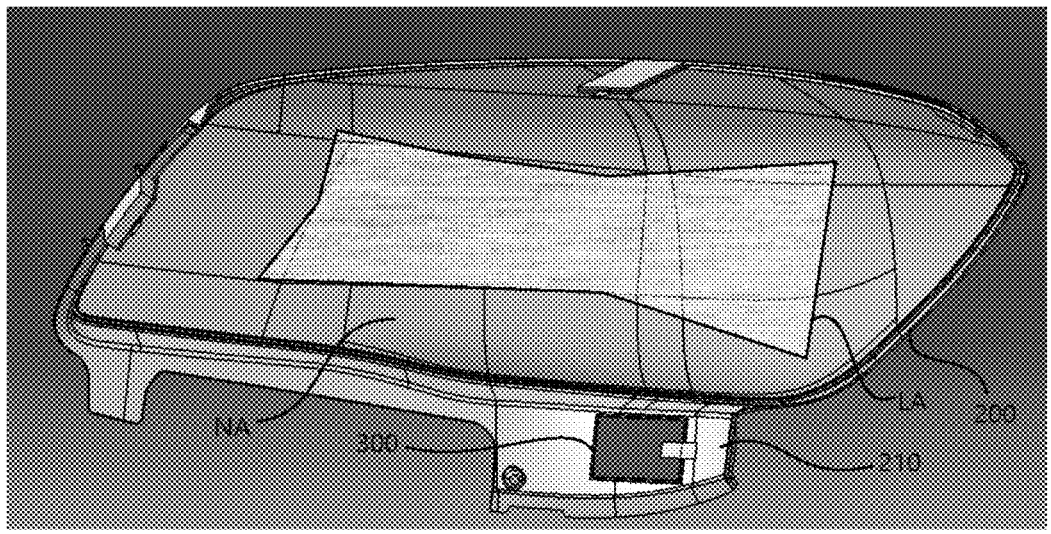
FIG. 4 is a view illustrating a light projection region and a non-projection region of an outer lens according to an exemplary embodiment.
Figure 5:
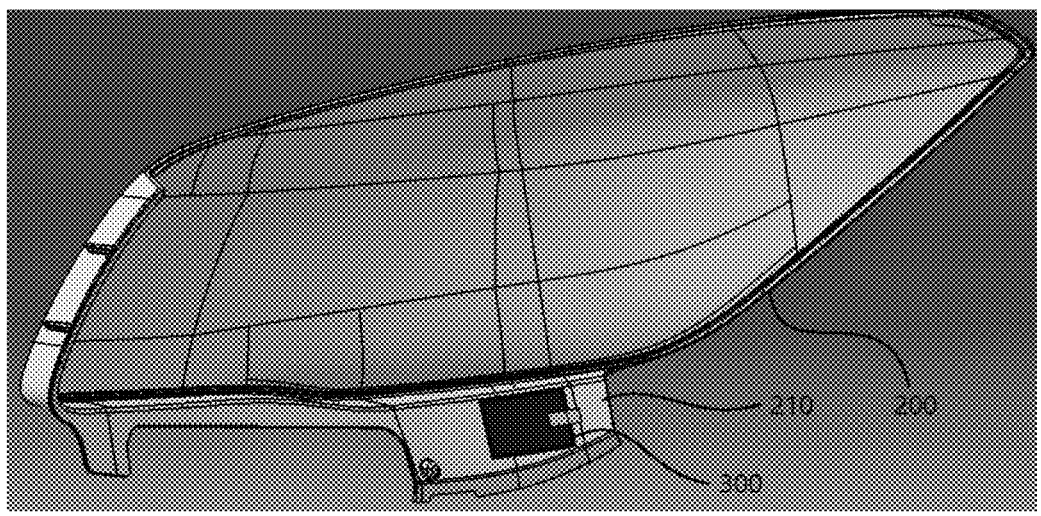
FIG. 5 is a view illustrating a state in which an actuator is attached to a guide portion that is a non-projection region of an outer lens according to another exemplary embodiment.

FIG. 4 is a view illustrating a light projection region and a non-projection region of an outer lens according to an exemplary embodiment, and FIG. 5 is a view illustrating a state in which an actuator is attached to a guide portion that is a non-projection region of an outer lens according to another exemplary embodiment.

Referring to FIGS. 4 and 5, the outer lens 200 according to an exemplary embodiment may be classified into a light projection region LA through which light irradiated from the light source 100 passes and a non-projection region NA which is the rest, and the actuator 300 according to the present invention may be provided in the non-projection region NA so that light irradiated from the light source 100 is not interfered with.

To this end, as shown in FIG. 5, the actuator 300 may be installed in a guide portion 210 of the outer lens 200 which is a portion of the non-projection region NA.

Here, the guide portion 210 is a coupling portion of the outer lens for coupling the car lamp 1000 to the car body, and the guide portion 210 may have a plate shape having a predetermined length and protrude from the edge of the outer lens 200.

The guide portion 210 may be provided in plurality, and when the actuator 300 has a plate shape in the non-projection region NA, the actuator 300 may be coupled to the guide portion 210 having a flat surface.

Figure 6:
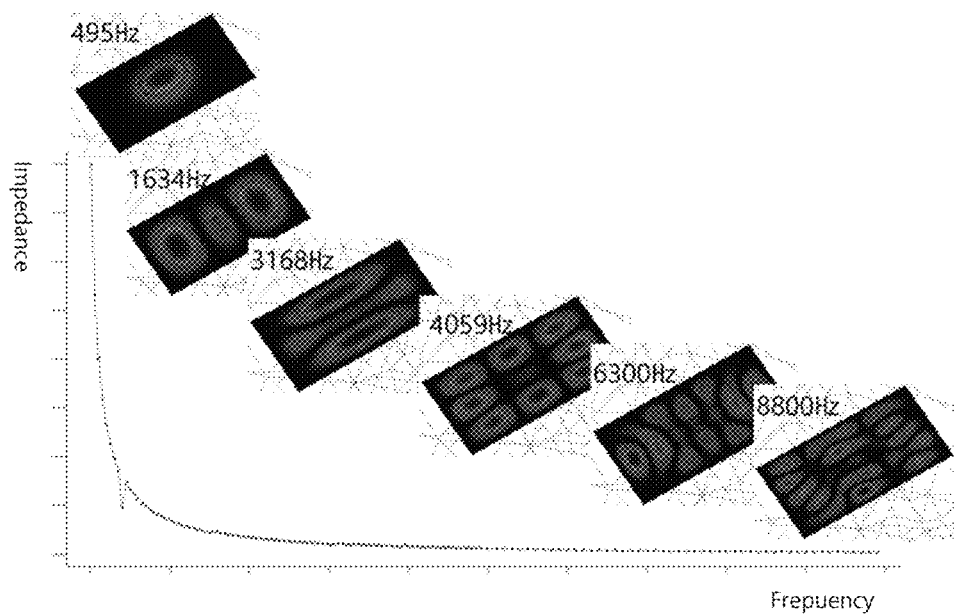
FIG. 6 is a view illustrating vibration intensity for each frequency according to an exemplary embodiment.
Figure 7:
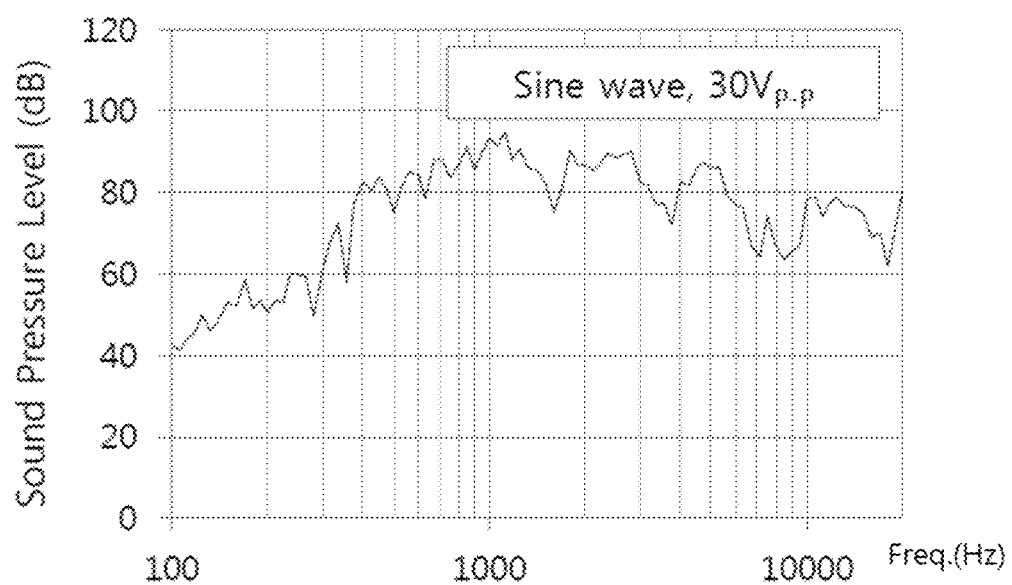
FIG. 7 is a view illustrating a natural frequency of an actuator according to an exemplary embodiment.

FIG. 6 is a view illustrating vibration intensity for each frequency according to an exemplary embodiment, and FIG. 7 is a view illustrating a natural frequency of an actuator according to an exemplary embodiment.

The rigidity of a material of the contact surface of the outer lens 200 in close contact with the actuator 300 according to an exemplary embodiment may determine a sound range output with respect to the same vibration of the actuator 300, and when the rigidity of the material of the contact surface of the outer lens 200 is low, the outer lens 200 vibrates larger with respect to the vibration received from the actuator 300, a clearer output is possible in the mid-bass band.

Referring to FIG. 6, it can be seen that, as the output frequency is small, central impedance of the actuator 300 increases and strong vibration is generated, and as the output frequency increases, the vibration spreads to the periphery and weak vibration is generated.

Therefore, when the rigidity of the material of the contact surface is low, the degree of vibration accompanying the strong vibration of the actuator 300 may increase, so that a sound range of a low frequency band may be clearly output, and when the rigidity of the material of the contact surface is high, the degree of accompanying vibration is small and it is impossible to smoothly output the sound range of the low frequency band.

Accordingly, in order for the actuator 300 to clearly output the sound of the low and mid-range band, the material of the contact surface of the outer lens 200 with which the actuator 300 is in close contact may be formed of a material having relatively low rigidity.

In addition, when a plurality of actuators 300 are provided in the outer lens 200 according to an exemplary embodiment, the plurality of actuators 300 may include a first actuator which is at least one outputting to include a low and mid-range band and a second actuator which is at least another one that does not include the low and mid-range band.

Since the first actuator that mainly outputs a low and mid-range band and the second actuator that mainly outputs a high-pitched band are configured, it is possible to configure more diverse and high-quality output sounds.

The first actuator and the second actuator may be determined according to the rigidity of the material of the contact surface of the outer lens 200 that is installed in close contact as described above, and to this end, the material of the first region which is the contact surface of the outer lens 200 corresponding to the first actuator may be configured to have rigidity lower than that of the material of the second region which is the contact surface of the outer lens 200 corresponding to the second actuator.

The rigidity of the outer lens 200 may be determined by the properties of the material constituting the outer lens 200 and a thickness of the contact surface of the corresponding outer lens 200.

Meanwhile, the material of the outer lens 200 provided with the actuator 300 may be configured not to be different from the natural frequency of the actuator 300 within a set predetermined range.

When the natural frequency of the actuator 300 and the natural frequency of the outer lens 200 are the same, a resonance phenomenon in which the amplitude of an object increases occurs. In the present invention, in order to generate such a resonance phenomenon, the outer lens 200 may be formed of a material so that a difference between the natural frequency of the actuator 300 and the natural frequency of the outer lens 200 has a value within a predetermined range (for example, the natural frequency of the outer lens 200 is in the range of 70% to 130%, more preferably 90% to 110% with respect to the natural frequency of the actuator 300).

In order to measure the natural frequency of the actuator 300, the natural frequency of the actuator 300 is checked using an impact hammer, and the outer lens 200 may be configured by checking a material having the natural frequency within the range of 95% to 105% from the checked natural frequency of the actuator 300.

Of course, it does not matter if the entire material of the outer lens 200 is formed of one material, but when the outer lens 200 is formed of different materials, the contact surface of the outer lens 200 with which the actuator 300 is installed in close contact may be formed of a material having a natural frequency different from the natural frequency of the actuator 300 within a predetermined range.

In addition, the actuator 300 according to an exemplary embodiment may tune a natural frequency through a separate tuning process, and the natural frequency of the actuator 300 according to an example may be configured as a 1 kHz band.

In addition, if the actuator 300 has a natural frequency of 1 khz band, the natural frequency of the outer lens 200, which may be formed of a PC material, may be tuned by adjusting the rigidity of the outer lens 200 to have a value within a predetermined range based on 1 khz, that is, 0.7 khz to 1.3 khz, more preferably, 0.9 khz to 1.1 kHz.

Meanwhile, the outer lens 200 according to an exemplary embodiment may include a fixing portion (not shown) for installing the actuator 300 fixedly.

Here, the fixing portion may be configured in various forms, for example, may be configured in the form of a frame case for accommodating the actuator 300 formed in a plate shape.

In the case of a fixing portion formed in a shape to accommodate such an edge, as an example, the actuator 300 may be fixed in the form of fitting to the fixing portion, and as another example, the actuator 300 may be inserted by sliding from one side of the fixing portion.

In addition, the contact surface of the actuator 300 according to an exemplary embodiment with the outer lens 200 may be treated to be opaque through sand blasting, or the like, so as not to be easily recognized even if the outer lens 200 is transparent to some extent, when the car lamp is viewed from the outside.

Figure 8:
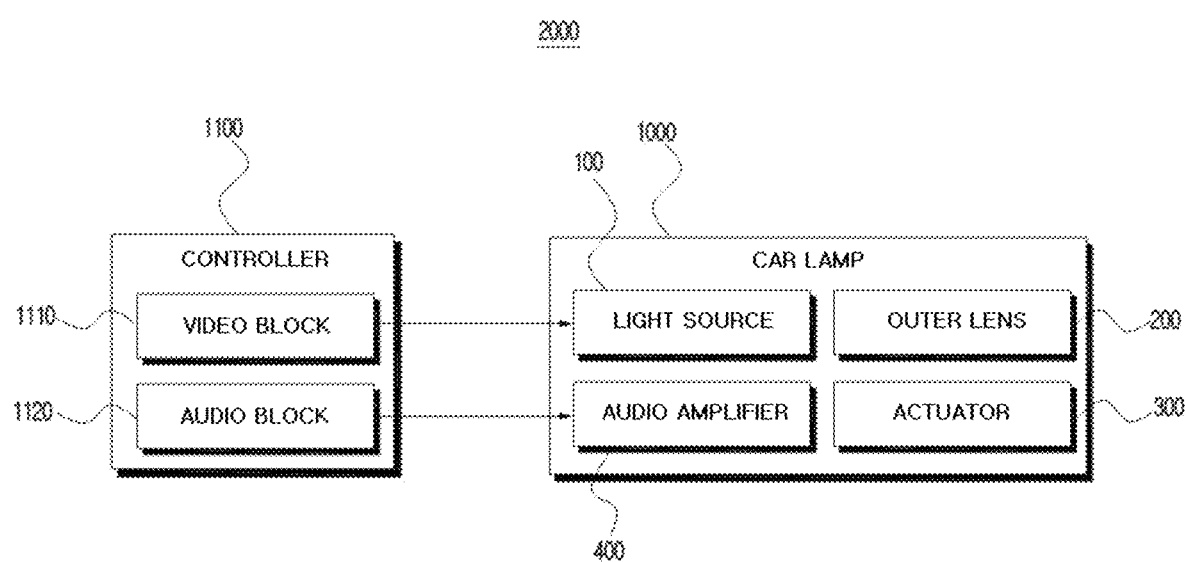
FIG. 8 is a block diagram illustrating an internal configuration of a communication system using a car lamp according to an exemplary embodiment.

FIG. 8 is a block diagram illustrating an internal configuration of a communication system using a car lamp according to an exemplary embodiment.

Referring to FIG. 8, a communication system 2000 according to an exemplary embodiment includes the car lamp 1000 described above and a controller 1100 transmitting at least one of a video signal and an audio signal to the car lamp 1000, and here, the controller 1100 transmits the video signal to the light source 100 of the car lamp 1000 and transmits the audio signal to the actuator 300.

As the video signal and the audio signal are controlled to be transmitted and output to the light source 100 and the actuator 300, respectively, through the controller 1100, the car lamp 1000 may simultaneously output an image and an audio, so that the video and audio may be provided to people around the car, as well as an occupant of the car.

Here, the video block 1110 and the audio block 1120 may be respectively mounted in the controller 1100 as a built-in type, and these video blocks 1110 and the audio block 1120 are configured to output high-resolution images and high-quality audio.

In addition, when the video block 1110 and the audio block 1120 are not provided in the controller 1100, a separate image codec and an audio codec may be provided externally to decode the video signal and the audio signal.

Through the communication system 2000 of the present invention as described above, images and audio may be provided from the car lamp 1000, so that communication for interaction may be performed between a car driver and pedestrians, and in addition, a function of entertainment allowing the user to enjoy content through video and audio output from the car lamp 1000.

To this end, the output video signal and the audio signal should be synchronized in advance. The controller 1100 according to an exemplary embodiment controls synchronization of a clock of the video signal transmitted to the light source 100 and a clock of the audio signal transmitted to the actuator 300.

Of course, when the resolution of the light source 100, that is, when there are not many pixels of the light source including LEDs, the controller 1100 may individually control the LEDs using a communication interface without controlling the video signal. In this case, a start bit of a video data packet and an audio clock signal may be output in synchronization.

In addition, when performing the synchronization control between the audio signal and the video signal described above, the controller 1100 may detect a video delay time which is a time taken for the light source 100 to finally perform output after the video signal is transmitted to the light source 100 and an audio delay time which is a time taken for the actuator 300 to finally perform output after the audio signal is transmitted to the actuator 300.

The controller 1100 may control synchronization to simultaneously perform output in consideration of the video delay time and the audio delay time.

That is, the controller 1100 does not control synchronization starting points of the audio signal and the video signal based on time points at which the audio signal and the video signal are transmitted to the light source 100 and the actuator 300, respectively, but control synchronization based on time points at which the light source 100 and the actuator 300 perform output.

Since this delay time is very small, synchronization may not be performed in general use situations, and when precise synchronization is required, synchronization may be performed considering the delay time according to a user setting or request.

Figure 9:
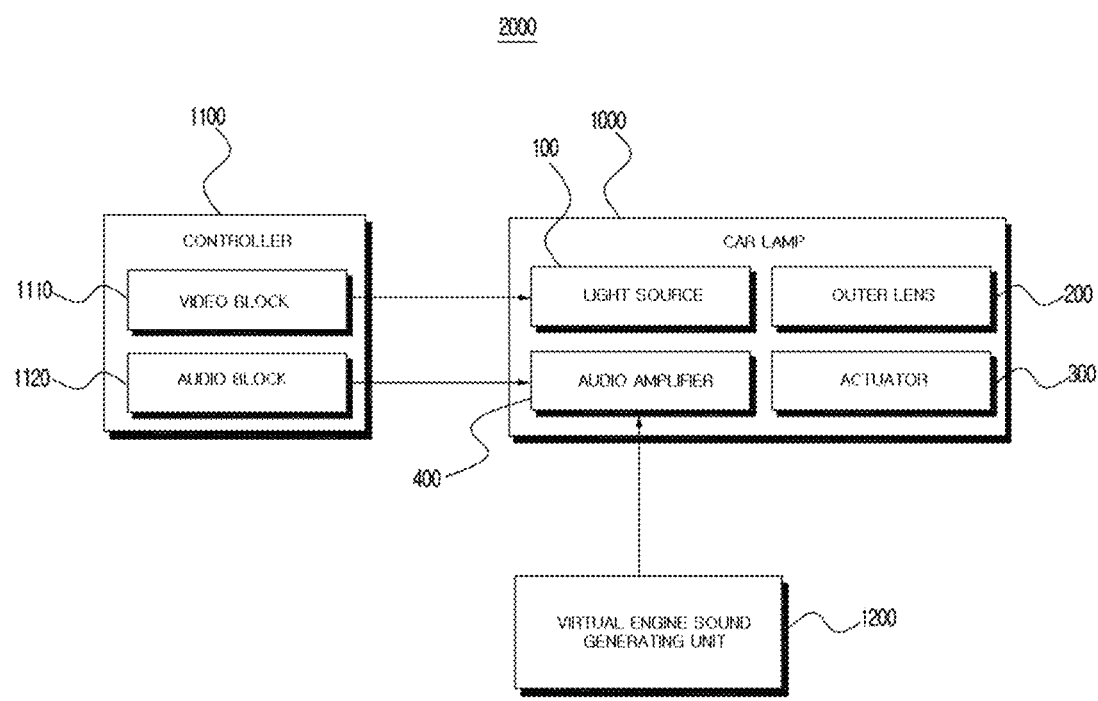
FIG. 9 is a block diagram illustrating a configuration of a communication system using a car lamp according to another exemplary embodiment.

FIG. 9 is a block diagram illustrating a configuration of a communication system using a car lamp according to another exemplary embodiment.

Referring to FIG. 9, a communication system 2000 according to the present exemplary embodiment may perform a sound output function of a virtual engine sound system mainly applied to electric vehicles.

To this end, the communication system 2000 of the present invention includes a virtual engine sound generating unit 1200 generating a virtual engine sound of a car in addition to the car lamp 1000 and the controller 1100 described above.

Here, currently the virtual engine sound generating unit 1200 receives output torque of a car, specifies an RPM corresponding to the output torque, and extracts virtual engine sound audio data corresponding to the specified RPM.

Accordingly, the extracted virtual engine sound audio data is transmitted to the actuator 300 described above and output, and in this case, the extracted virtual engine sound audio data may be transmitted to the actuator 300 through the audio amplifier 400 as shown in FIG. 8.

In addition, when the car lamp 1000 of the present invention is applied to headlamps installed on the left and right sides of the car, an audio block or audio codec may separately control the left and right car lamps 1000 to output stereo sound.

Meanwhile, since the car lamp 1000 applied to the communication system 2000 according to the present invention is the same as the car lamp 1000 described above, the detailed thereof will be omitted.

According to the present invention, there is an effect of improving a communication function and providing an entertainment function to a user by synchronizing audio to a car lamp capable of outputting an image and output.

In addition, since a virtual engine sound is output, the car lamp capable of sound output may replace the existing virtual engine sound system.

What is claimed is:

1. A car lamp capable of sound output, the car lamp comprising:
   a light source;
   an outer lens disposed on a front side of the light source;
   an actuator provided on one side of the outer lens and adapted to contact the outer lens based on a received audio signal to vibrate the outer lens;
   an audio amplifier adapted to amplify the received audio signal and output the amplified audio signal to the actuator; and
   a plurality of actuators, wherein:
   when at least one of the plurality of actuators is a first actuator and at least another one of the plurality of actuators adapted to output a high-pitched sound band compared to the first actuator is a second actuator, and
   a first region, which is a contact region of the outer lens with which the first actuator is in contact, has a lower rigidity than that of a second region, which is a contact region of the outer lens with which the second actuator is in contact.

2. The car lamp of claim 1, wherein:
   a contact region of the outer lens is formed of a material so that a difference between a natural frequency of the actuator and a natural frequency of the contact region is within a predetermined range.

3. The car lamp of claim 1, wherein:
   one side of the actuator is in close contact with an inner surface of the outer lens facing the light source, and
   the car lamp further comprises a vibration space portion having a width of 2 mm or greater on another side of the actuator so that the actuator vibrates.

4. The car lamp of claim 1, wherein:
   the outer lens includes a light projection region and a non-projection region, and the actuator is installed in the non-projection region.

5. The car lamp of claim 1, wherein:
   the outer lens further includes a fixing portion fixing at least a portion of the actuator.

6. A communication system comprising:
   a car lamp of claim 1; and
   a controller adapted to transmit a video signal and an audio signal generated based on received video data and audio data to the light source and the audio amplifier of the car lamp, respectively,
   wherein the controller is adapted to transmit the video signal and the audio signal in synchronization.

7. The communication system of claim 6, wherein:
   the controller is adapted to detect a video delay time, which is a time taken for the light source to output corresponding light after the video signal is transmitted to the light source, and an audio delay time, which is a time taken for the actuator to output corresponding vibration after the audio signal is transmitted to the actuator, and transmit the video signal and the audio signal so that the output light and the output vibration are synchronized with each other based on the video delay time and the audio delay time.

8. The communication system of claim 6, further comprising:
   a virtual engine sound generating unit adapted to generate a virtual engine sound of a car,
   wherein the virtual engine sound generating unit is adapted to transmit the generated virtual engine sound to the actuator to output the virtual engine sound.

9. A communication system comprising:
   a car lamp capable of sound output comprising:
      a light source;
      an outer lens disposed on a front side of the light source;
      an actuator provided on one side of the outer lens and adapted to contact the outer lens based on a received audio signal to vibrate the outer lens; and
      an audio amplifier adapted to amplify the received audio signal and output the amplified audio signal to the actuator;
   wherein the material of the area of a contact region of the outer lens which the actuator is in contact, has a lower rigidity than that of a region which the actuator is not in contact.

10. A communication system comprising:
    a car lamp capable of sound output comprising:
       a light source;
       an outer lens disposed on a front side of the light source;
       an actuator provided on one side of the outer lens and adapted to contact the outer lens based on a received audio signal to vibrate the outer lens; and
       an audio amplifier adapted to amplify the received audio signal and output the amplified audio signal to the actuator; and
    a controller adapted to transmit a video signal and an audio signal generated based on received video data and audio data to the light source and the audio amplifier of the car lamp, respectively,
    wherein the controller is adapted to transmit the video signal and the audio signal in synchronization.

* * * * *